April 20, 1965 M. E. ARTHUR 3,179,921
VITALIZATION ALARM INDICATION
Filed Nov. 26, 1958
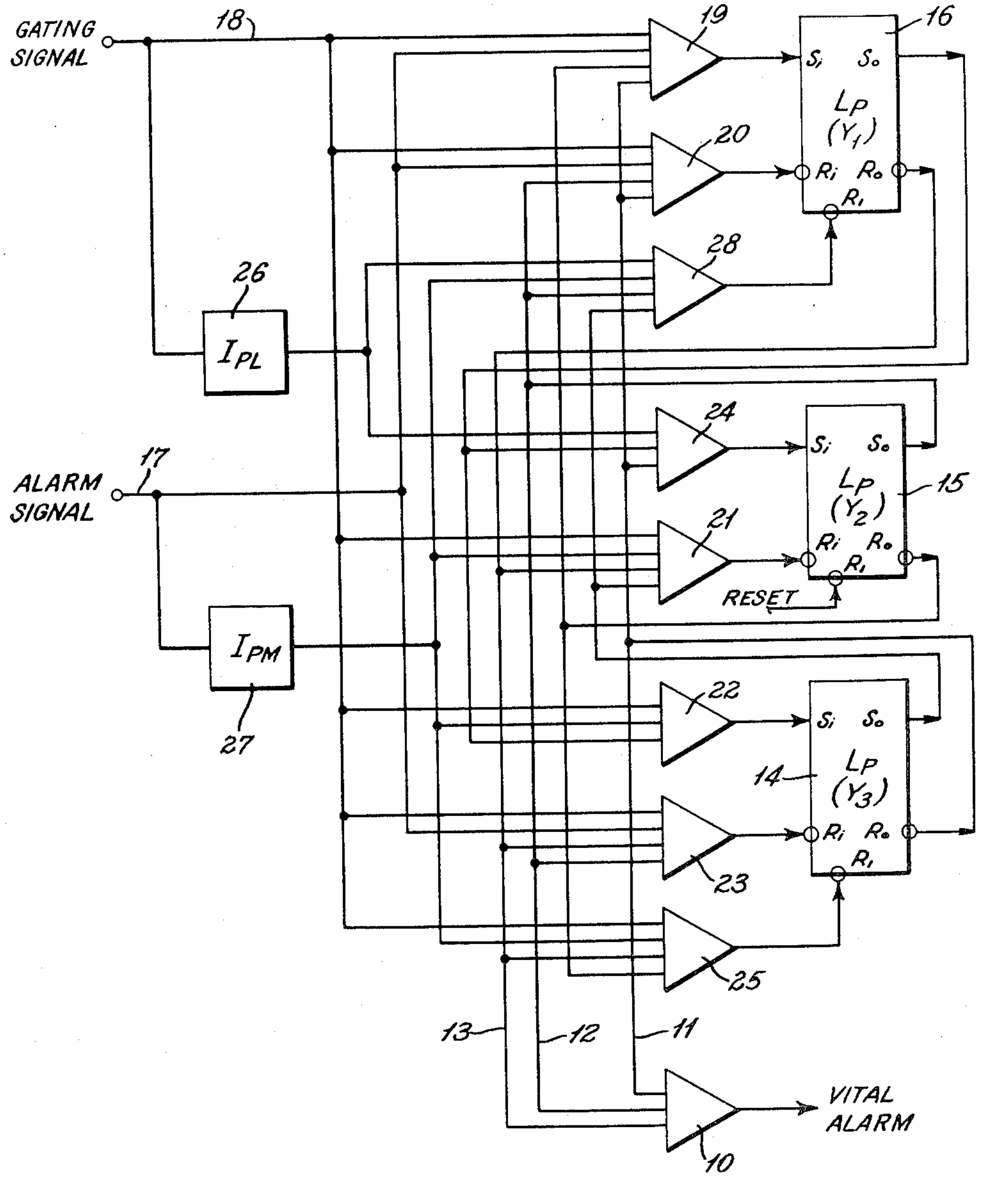
LEGEND
▷ - NEGATIVE AND
$R_i$ - RESET INPUT
$R_o$ - RESET OUTPUT
$S_i$ - SET INPUT
$S_o$ - SET OUTPUT
L - LATCH
I - INVERTER
INVENTOR
Merwyn E. Arthur
BY Sughrue & Rothwell
ATTORNEYS 3,179,921

VITALIZATION ALARM INDICATION

Merwyn E. Arthur, Endicott, N.Y., assignor to International Business Machines Corporation, New York, N.Y., a corporation of New York Filed Nov. 26, 1958, Ser. No. 776,509
7 Claims. (Cl. 340—146.1)

This invention relates to error indicators associated with computers and the like and more particularly to a circuit for providing an indication of a predetermined repetition of an error within a predetermined number of cycles.

In computing systems, provision is often made for parity checking of words in the information handling routine. Some systems provide an alarm lamp which is lighted whenever an error occurs. The result of such a system has been that the lamp remains lighted all of the time due to the fact that it does not have time to go off before the next error occurs.

An object of this invention is to provide a circuit which provides an alarm signal (hereinafter called vital alarm) only when an error is repeated a predetermined number of times within a predetermined number of cycles—a cycle being defined broadly as an interval of time during which an error can occur.

Specifically, the object of this invention is to provide a vital alarm signal whenever the parity checking routine of the computer indicates the occurrence of an error in two out of three successive cycles. The cycle permits a word interval and a gating signal interval at the end of the word interval. The alarm signal from the computer, indicating lack of parity in the word, may occur at any time during the word interval and continues to the end of the cycle. The gating interval accommodates a gating signal which is turned on each cycle after the word interval and turned off before or at the end of the cycle. In the event of no error (parity) in a cycle, the gating signal alone is fed to the circuit of this invention and may be identified as a no-error signal. In the event of an error (lack of parity), an alarm signal is fed to the circuit of this invention and in combination with the gating signal constitutes an error signal to the circuit of this invention.

The circuit of this invention functions as a reversible counter and in the specific sense a counter with a maximum capacity of three counts. By so introducing the error signal to the counter so as to add two counts thereto and by so introducing the non-error signal to the counter so as to subtract one count therefrom, it can be seen that the maximum capacity of the counter (3) is reached if an error signal is fed to the circuit of this invention in two out of three successive cycles. When the maximum capacity of the counter is reached, means are provided to produce the vital alarm.

In general then, the present invention relates to a circuit for providing an indication upon the accumulation of a predetermined number of error signals within a predetermined number of cycles in which said signals can selectively occur once per cycle that comprises a reversible counter, means to add $n$ counts to said counter upon the occurrence of an error signal within a cycle, means to subtract $m$ counts from said counter upon the occurrence of a no-error signal within a cycle, where $n$ is larger than $m$, and means to provide an alarm signal from said counter when the counter therein reaches said accumulation.

The above-identified objects and others will be apparent from a detailed description of the accompanying drawing.

In the drawings: The single figure is a view showing a diagrammatic representation of the circuit constructed in accordance with this invention.

Referring to the figure, the blocks 14, 15 and 16 identify latches. These latches may be of a conventional type; bistable devices having a SET state and a RESET state. Each latch has one SET input thereto identified by the arrow in the absence of a circle and at least one RESET input thereto identified by the arrow with a circle. Each latch has a SET output which is positioned opposite to the SET input and a RESET output which is positioned opposite to one of the RESET inputs and also identified by a circle. A latch which is set by the introduction of a relatively negative or down level to the SET input will remain in this stable state despite the occurrence of successive SET inputs thereto. At this time, the SET output of the latch will be at a down level. A SET latch may be RESET by the introduction of a down level at any of its RESET inputs to provide a down level at the RESET output thereof. When the RESET output is at a down level, the SET output is at an up level and vice-versa. Although there are many latching circuits that may be employed in accordance with this invention, the preferred form is shown and described in the copending application of Gene J. Cour, entitled Bit Gate Generator, filed June 27, 1958, application Serial No. 745,194, now U.S. Patent No. 3,017,627.

Numerals 26 and 27 identify inverters. These inverters function to provide an up level output at the output terminal thereof upon the occurrence of a down level input thereto and vice-versa. Although the inverters commonly employed in the art may be used, those preferred in accordance with this invention are those described in the previously identified copending application. Numerals 10, 19, 20, 21, 22, 23, 24, 25, and 28 identify negative AND gates having a plurality of inputs thereto and a single output therefrom. When all of the inputs to an AND gate are down, the output is down. Whenever less than all of the inputs are down, the output therefrom is up.

AND gate 10 is unblocked to provide a vital alarm signal at the output thereof whenever its three inputs 11, 12 and 13 are down. Line 11 connects to the RESET output of latch 14, line 12 to the SET output of latch 15 and line 13 to the RESET output of latch 16. Therefore, to obtain a vital alarm signal, latch 14 must be RESET, latch 15 SET and latch 16 RESET.

Each cycle as has previously been mentioned includes a word interval followed by a gating signal interval. If an error in the computer occurs, it is indicated by an alarm signal which provides a down level on line 17. It may occur at any time during the word interval and continued to the end of the cycle. Once each cycle, during the gating signal interval, a gating signal appears as a down level on line 18 and continues until sometime immediately before the end of a cycle.

SEQUENCE 1

In this sequence, let it be assumed that an error occurs only once during three consecutive cycles. Let it further be assumed that this error occurs in the second of these three cycles. All latches are originally RESET.

*First cycle*

The gating signal is applied to gates 19, 20, 21, 22, 23 and 25. Since all of the latches are originally RESET providing down level outputs at the RESET outputs thereof and up level outputs at the SET outputs thereof gates 24 and 22 are blocked. This means that latches 14 and 15 remain in a RESET state. Gate 19 is blocked because line 17 is up (no error having occurred). Consequently, all gates controlling the SET inputs of the latches are blocked and the latches remain RESET. When the gating signal terminates, gates 19, 20, 21, 22, 23 and 25 are blocked. Gate 24 is blocked by the SET output of latch 16 which is up. Still no change in the state of the latches.

They all remain RESET and gate 10 remains blocked during the first cycle.

*Second cycle*

When the error occurs, an alarm signal appears on line 17 providing a down level thereon. Latches 14 and 16 remain RESET due to the up level on line 18 at this time. Also latch 15 remains RESET due to the up level from the SET output of latch 16. Then the gating signal occurs and provides a down level on line 18. Gate 19 is unblocked since its inputs are (1) connected to line 18; (2) line 17; (3) RESET output of latch 15; and, (4) RESET output of latch 14. Latch 16 is then SET by the down level from gate 19 to the SET input of latch 16. When the gating signal terminates, gate 24 is unblocked since its lines are connected to (1) the output of inverter 26; (2) the SET output of latch 16; and, (3) the RESET output of latch 14. So latch 15 is SET. Latch 14 remains RESET. Now latch 16 is SET, latch 15 is SET and latch 14 is RESET. Gate 10 is still blocked and no vital alarm signal is obtained.

*Third cycle*

By the same logic it can be seen that since no error occurs during this third cycle the occurrence of the gating signal will place all of the latches in their SET condition and the termination of the gating signal will RESET latch 16 and leave latches 15 and 14 SET.

It can be seen that the sequence such as identified above in connection with the first, second and third cycles does not produce a vital alarm at the output of AND gate 10 since gate 10 remains blocked during all three cycles. At the end of the third cycle however the circuit is in condition to provide a vital alarm in case the next cycle contains an error signal.

It can also be seen that if no error occurs during any of the three cycles no change in state of the latches occurs.

SEQUENCE 2

Let it be assumed that an error occurs in the first and second cycles. All latches are originally RESET.

*First cycle*

The occurrence of the first alarm signal due to an error provides a down level on line 17. When the gating signal occurs gate 19 is unblocked to set latch 16. When the gating signal terminates, gate 24 is unblocked to SET latch 15. Latch 14 remains RESET.

*Second cycle*

The occurrence of the second alarm signal due to an error provides a down level on line 17. When the gating signal occurs gate 20 is unblocked to RESET latch 16. Latch 15 remains SET since gate 21 is blocked by the output of inverter 27. Latch 14 remains RESET since gate 22 is blocked by the output of inverter 27. Gate 10 is unblocked since latch 16 is RESET, latch 15 is SET and latch 14 is RESET. A vital alarm signal is provided from gate 10. By a manual RESET to latch 15, all of the latches may again be placed in the RESET condition after the occurrence of the vital alarm. The same sequence occurs if the errors occur during the second and third cycles rather than as in connection with sequence No. 2 in the first and second cycles.

SEQUENCE 3

Let us assume now that the error occurs in the first and third cycles. All latches are originally RESET.

*First cycle*

Latches 16 and 15 are SET and latch 14 remains RESET.

*Second cycle*

Latch 14 is placed in a SET condition and thereafter latch 16 is RESET. Latch 15 remains SET.

*Third cycle*

Latch 16 remains RESET, latch 15 remains SET and latch 14 is RESET. This unblocks gate 10 to provide a vital alarm signal.

It can be seen that the circuit functions as a reversible counter. Different values or weights are given to the words with alarm and words without alarm. The words with the alarm add a count of two in the counter and the words without alarm subtract one therefrom. The counter accumulates sums between zero and three and the following are the latch conditions for all of the counts.

| Count | Latch 16 | Latch 15 | Latch 14 |
|---|---|---|---|
| 0 | RESET | RESET | RESET. |
| 1 | RESET | SET | SET. |
| 2 | SET | SET | RESET. |
| 3 | RESET | SET | RESET. |

It can be seen then that the counter accumulates over three intervals of time. The three consecutive periods start with the first alarm to the counter. This stores a two in the counter. If this is followed by a no-alarm word, the counter drops to a sum of one. If this is followed by an alarm, the sum is then three and the vital alarm signal is given. If, however, it were followed by a no-alarm word, the sum would drop back to zero.

Other weights of the alarms and other capacities of the counter can be intrumented. For instance, increasing the capacity of the above counter to six, keeping the weights the same would allow (1) five alarms spread alternately over nine sample periods, (2) alarms in any four of six sample periods, or (3) any three consecutive alarms to give the vital alarm at the expense of one more latch and about three times the logical elements.

What has been disclosed and described in one embodiment of the present invention. Other embodiments obvious from the teachings herein to those skilled in the art are contemplated to be within the spirit and scope of the following claims.

What is claimed is:

1. A circuit for providing an indication upon the accumulation of a predetermine number of error signals within a predetermined number of cycles, each of said cycles including an error signal or the absence of an error signal, means for generating a gate signal during each cycle, said circuit comprising a reversible counter, means responsive to the coincidence of an error signal and a gating signal to add *n* counts to said counter, means responsive to a gating signal alone to subtract *m* counts from said counter, where *n* is larger than *m*, and means to provide an output signal from said counter when the count therein reaches the accumulation of said predetermined number of error signals within said predetermined number of cycles.

2. A circuit as defined by claim 1 wherein said counter includes a plurality of stages, each of said stages including a bistable device.

3. A circuit as defined by claim 2 wherein said means to provide an output signal from said counter comprises an AND gate and means connecting selected outputs of said bistable devices to the inputs of said AND gate whereby said output signal is provided when said selected outputs of said bistable devices are all similarly polarized.

4. A circuit for providing an indication upon the accumulation of a predetermined number of error signals within a predetermined number of cycles, each of said cycles including an error signal or a no error signal, said circuit comprising a multistage reversible counter, each of the stages of said counter including a bistable device having set and reset stable states and set and reset inputs and outputs, first gating means having inputs and outputs associated with a no error signal, second gating means having inputs and outputs associated with an error signal, said gating means having blocked and unblocked conditions, said conditions determining the state of said devices, means connecting the outputs of said first and second gating means to selected inputs to said devices, means connecting selected outputs of said devices to selected inputs of said first and second gating means, means to apply said no error signals to the inputs to said first gating means, means to apply said error signals to the inputs to said second gating means and means connected to selected outputs of said devices to provide said indication when said devices assume predetermined states.

5. A circuit as defined by claim 4 wherein said indication means comprises and AND gate providing said indication when all of the inputs thereto from said bistable devices are provided with similarly polarized output levels by said bistable devices.

6. A reversible counter comprising a counter, means to generate a first signal, means to generate a second signal, means responsive to the coincidence of said first and second signals for adding *n* counts to said counter and means responsive to said second signal alone for subtracting *m* counts from said counter, where *n* is larger than *m*.

7. A reversible counter having a maximum capacity count, means to generate a first signal, means to generate a second signal, means responsive to the coincidence of said first and second signals for adding *n* counts to said counter, means responsive to said second signal alone for subtracting *m* counts from said counter, where *n* is larger than *m*, means selectively to control the application of said signals to said counter and means to indicate when said maximum count is obtained.

References Cited by the Examiner

UNITED STATES PATENTS

| | | | |
|---|---|---|---|
| 2,537,427 | 1/51 | Seid et al. | 340—347.3 |
| 2,656,106 | 10/53 | Stabler | 328—44 XR |
| 2,735,005 | 2/56 | Steele | 328—44 |
| 2,874,343 | 2/59 | Steele | 340—347 |
| 2,877,895 | 3/59 | Drader | 209—88 |
| 2,880,934 | 4/59 | Bensky et al. | 328—44 |
| 2,983,375 | 5/61 | Gates | 209—88 |
| 3,023,371 | 2/62 | Balish | 235—92 |

NEIL C. READ, *Primary Examiner.*

IRVING SRAGOW, EVERETT R. REYNOLDS, ROBERT H. ROSE, *Examiners.*